INVENTOR.
WALTER E. PALMER

United States Patent Office 3,702,755
Patented Nov. 14, 1972

3,702,755
MOISTURE INDICATOR FOR PLANTS
Walter E. Palmer, 501 Oxford St.,
San Francisco, Calif. 94134
Filed July 21, 1971, Ser. No. 164,537
Int. Cl. G01n 31/06, 31/22
U.S. Cl. 23—253 TP                                    1 Claim

ABSTRACT OF THE DISCLOSURE

A moisture indicator for plants which may be placed in the soil adjacent to a plant to indicate the plant's need for water before the plants themselves begin to indicate their need by wilting. The indicator is particularly useful for house plants which are frequently underwatered or overwatered and it provides a positive visual indication of a plant's need.

SUMMARY OF THE INVENTION

It is always difficult to tell when a plant needs water since there is frequently sufficient water under the soil surface for the needs of a plant but there is no surface indication of this. The need for such an indicator to tell when a plant needs water is particularly acute for house plants. If one waits until the plant starts wilting before watering, a substantial amount of damage may have already been done to the plant. On the other hand, house plants more often suffer from overwatering so that it is useful to have an indicator to show the need for water to prevent overwatering.

Various moisture indicating devices have been proposed in the past but they have suffered from a number of deficiencies. Those indicators which rely on some mechanical motion are too complicated and expensive for the ordinary home owner to use in quantity. Other indicators have depended on a wick element or the like where a darkening of the material will indicate the amount of moisture in the soil. Such devices are difficult to read since the change in shade is very subtle and may go unnoticed.

Chemical indicators have been proposed which make an abrupt color change in the presence or absence of moisture but these have not ordinarily been successful since such indicators are ordinarily hygoscopic and the large amount of moisture they attract tends to dissolve out and render the color indicator ineffective.

In accordance with the present invention, a simple inexpensive indicator is provided which is made of few parts and which gives a positive color change depending on the amount of moisture present in the soil. The device includes a wick element for bringing moisture out of the soil to the indicating device but the indicating device itself is isolated from the wick element so that there is much less tendency for the hygroscopic element to dissolve.

The device of the present invention is very inexpensive so that it can be used in large quantities by the average gardener and lends itself to even being used as an advertising giveaway by fertilizer manufacturers and the like.

DESCRIPTION OF THE PREFERRED EMBODIMENTS

Figure 1:
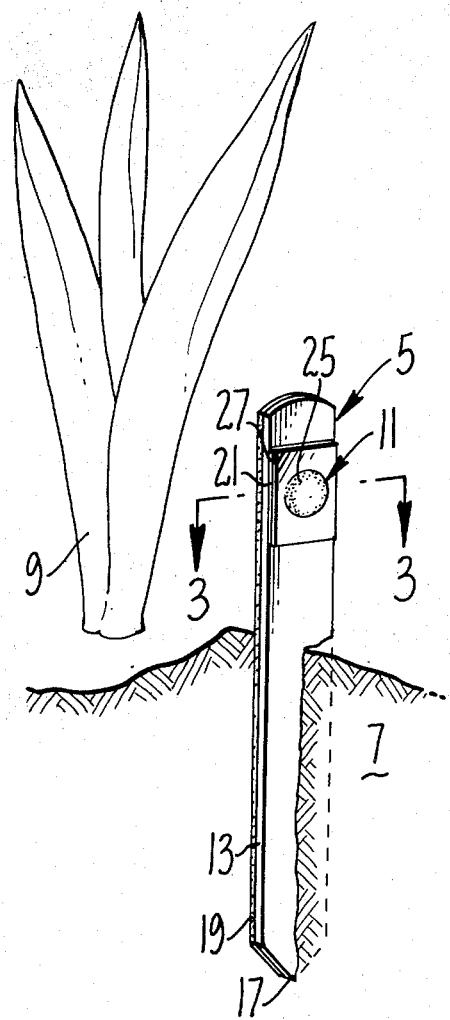
FIG. 1 is a perspective view of a device embodying the present invention showing its use in the soil.

Referring now to the drawings by reference characters, the device of the present invention is generally designated 5 and in use it is normally inserted for half its length or so into soil 7. Plants, as at 9, would normally be growing in the soil. As can be seen, the device 5 is in the form of a stake having a window opening, generally designated 11, through which one reads the amount of moisture in the soil. In one embodiment of the invention, the moisture indicating element is blue when the soil is very dry and changes to various hues of blue and bluish red as the moisture increases, finally achieving a rose pink color. Thus, when one comes into a garden, he can tell at a glance the condition of the soil several inches or so under the surface of the soil.

Figure 2:
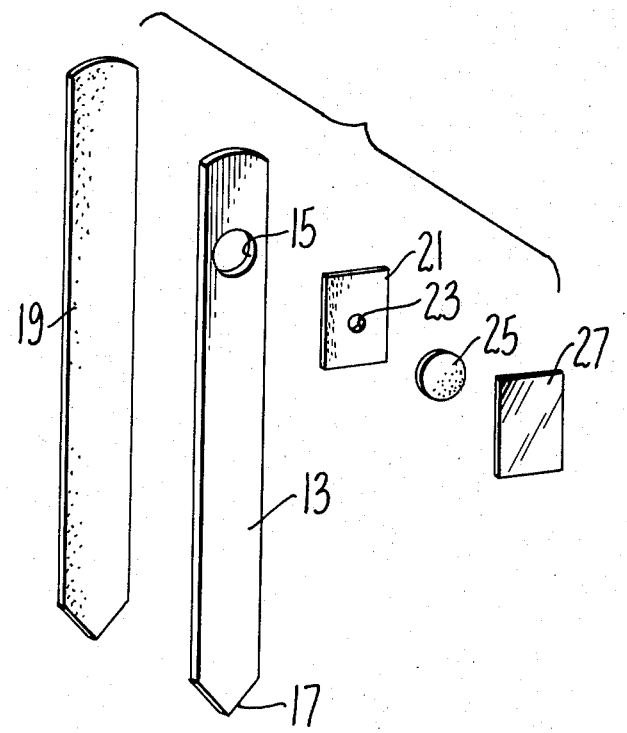
FIG. 2 is an exploded view of a device embodying the present invention.
Figure 3:
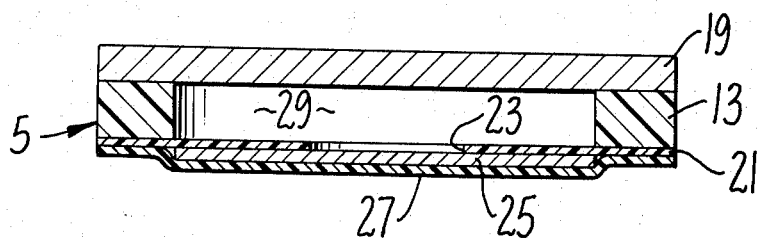
FIG. 3 is an enlarged section on the line 3—3 of FIG. 1.

The construction of the device can best be seen in FIGS. 2 and 3. The device includes a stake element 13 having a hole 15 near the top end thereof and having a sharpened bottom portion 17. The stake is made of a material which is sufficiently stiff to be driven into the soil, such as wood or metal and preferably plastic. Mounted behind the stake element is a wick element 19 which can be made of blotting paper or felt, although any material which will convey moisture from one place to another may be used. Mounted over the hole 15 in element 13 is a small piece of water impervious material 21 having a relatively small opening 23 therein. Element 21 is thin and can be made of any material which does not transmit moisture such as a waterproof plastic film. Mounted over element 21 is the element 25, roughly the size of the opening 15, of a moisture indicating material. This will be described in more detail later. Mounted on top of this is a transparent sheet 27 of a moisture resistant material. Ordinary pressure sensitive tape is suitable for this purpose. If the element 21 is made of a pressure sensitive tape, the element 27 can also be made of a pressure sensitive tape and these elements can be of the same size. If the element 21 does not have an adhesive thereon, the element 27 can be made somwhat larger than element 21 to hold the device together.

Referring specifically to FIG. 3, it will be seen that the opening 23 is considerably smaller than the moisture indicating element 25 and that there is a suubstantial air space 29 between the wick element 19 and the moisture indicating element 25. Thus, there is complete isolation between the wick and the moisture indicating element so that the moisture indicating element is actually indicating the amount of moisture in the air space 29. Even if the element 25 contains a substantial amount of a hygroscopic material, there will be no tendency for the device to bleed since the hygroscopic material is retained by the layers of material on each side of it and is only exposed through the relatively small opening 23.

This invention is not based on the use of any particular moisture sensitive material. Such materials are commercially available and can be utilized. A typical material which can be employed can be made by saturating white paper with the following liquid:

Cobalt chloride _____ grams__  45
Water _____ ml__ 100

The amount of moisture is roughly indicated by the changing color of the paper, as follows:

Rose pink _____ Wet.
Pale pink _____ Very moist.
Bluish pink _____ Moist.
Lavender blue _____ Nearly dry.
Blue _____ Very dry.

It is obvious that many changes can be made in the exact details of the structure without departing from the spirit of this invention. One practical embodiment of the invention consists of a stake of about 4 inches long and ½ inches wide but it is obvious that the device might be made larger or smaller or in different shapes depending upon the needs of the user. The opening 23 should be substantially smaller than the opening 15 but great variations in this dimension are possible.

I claim:
1. A soil moisture indicator comprising in combination:
(a) a stake element,
(b) a hole near the top of said stake element,
(c) a wick on one side of said stake element and having subustantially the same dimensions as said stake element,
(d) a thin sheet of impervious material having a small opening over said hole and mounted on the opposite side of said stake from the wick element,
(e) a moisture color indicator mounted over said hole, and
(f) a transparent window over said moisture indicator whereby said moisture indicator is spaced from said wick element.

References Cited
UNITED STATES PATENTS

| | | | |
|---|---|---|---|
| 2,017,376 | 10/1935 | Rother et al. | 73—73 |
| 3,019,638 | 2/1962 | Klein | 73—73 |
| 3,117,442 | 1/1964 | Brooks | 116—114 AM |

MORRIS O. WOLK, Primary Examiner

R. M. REESE, Assistant Examiner

U.S. Cl. X.R.

116—114 AM